US00RE45979E

(19) United States
(12) Reissued Patent
Yoo

(10) Patent Number: US RE45,979 E
(45) Date of Reissued Patent: *Apr. 19, 2016

(54) POWER-SAVING CIRCUIT AND METHOD FOR A DIGITAL VIDEO DISPLAY DEVICE

(75) Inventor: Sun-Il Yoo, Suwon-si (KR)

(73) Assignee: Samsung Electronics Co., Ltd., Suwon-si (KR)

( * ) Notice: This patent is subject to a terminal disclaimer.

(21) Appl. No.: 13/337,237

(22) Filed: Dec. 26, 2011

Related U.S. Patent Documents

Reissue of:
(64) Patent No.: 6,587,101
Issued: Jul. 1, 2003
Appl. No.: 09/817,145
Filed: Mar. 27, 2001

U.S. Applications:
(63) Continuation of application No. 11/171,651, filed on Jul. 1, 2005, now Pat. No. Re. 43,202.

(51) Int. Cl.
*G06F 3/038* (2013.01)
*G09G 5/00* (2006.01)
*G06F 1/32* (2006.01)

(52) U.S. Cl.
CPC ..... *G06F 3/038* (2013.01); *G06F 1/3203* (2013.01); *G09G 2330/021* (2013.01); *G09G 2330/022* (2013.01)

(58) Field of Classification Search
CPC ..... G09G 2330/021; G09G 2330/022; G06F 1/3203; G06F 3/038
USPC ..... 345/211–213; 713/300, 310, 320–324, 713/330, 430, 500; 348/730
See application file for complete search history.

(56) References Cited

U.S. PATENT DOCUMENTS 4,019,090 A 4/1977 Wolff et al.
RE29,273 E 6/1977 Reiffin
(Continued)

FOREIGN PATENT DOCUMENTS

EP 0599273 A 6/1994
JP 05046108 2/1993
(Continued)

OTHER PUBLICATIONS

"DVI 1.0 Specification", Digital Display Working Group, Apr. 2, 1999, pp. 1-76, http://www.ddwg.org/lib/dvi_10.pdf.
(Continued)

*Primary Examiner* — Ricardo L Osorio
(74) *Attorney, Agent, or Firm* — Jefferson IP Law, LLP

(57) ABSTRACT

A power-saving circuit for a digital video display device includes a TMDS driving unit converting a TMDS data signal and a TMDS clock signal, a display driving unit driving a display unit based on the horizontal/vertical synchronous signals and the digital video signal input from the TMDS driving unit, a clock signal detecting unit outputting a first or a second level of a clock detecting signal depending on the TMDS clock signal, a controller outputting a first-level of a power-saving signal when the first level clock detecting signal is input, and outputting a second level of power-saving signal when the second level clock detecting signal is input, and a power supply unit supplying a voltage to respective components, and cutting off the supply of the voltage to respective components depending on the level of the power-saving signal or the clock detecting signal.

62 Claims, 3 Drawing Sheets

(56) References Cited

U.S. PATENT DOCUMENTS

| | | | | | |
|---|---|---|---|---|---|
| 4,477,842 | A | | 10/1984 | Kaneko | |
| 4,806,784 | A | | 2/1989 | Goda | |
| 5,375,245 | A | * | 12/1994 | Solhjell et al. | 345/212 |
| 5,430,413 | A | | 7/1995 | Fogal | |
| 5,475,402 | A | | 12/1995 | Hijikata | |
| 5,576,738 | A | | 11/1996 | Anwyl et al. | |
| 5,638,092 | A | | 6/1997 | Eng et al. | |
| 5,696,978 | A | | 12/1997 | Nishikawa | |
| 5,745,105 | A | | 4/1998 | Kim | |
| 5,757,340 | A | | 5/1998 | Okamoto et al. | |
| 5,808,693 | A | * | 9/1998 | Yamashita et al. | 348/730 |
| 5,854,618 | A | | 12/1998 | Kiwiet et al. | |
| 5,886,689 | A | | 3/1999 | Chee et al. | |
| 5,926,173 | A | | 7/1999 | Moon | |
| 6,006,335 | A | | 12/1999 | Choi et al. | |
| 6,020,879 | A | * | 2/2000 | Nakabayashi | 345/212 |
| 6,069,619 | A | | 5/2000 | Kim | |
| 6,081,131 | A | | 6/2000 | Ishii | 326/68 |
| 6,115,033 | A | | 9/2000 | Choi | |
| 6,317,839 | B1 | | 11/2001 | Wells | |
| 6,393,572 | B1 | | 5/2002 | Datta et al. | |
| 6,404,423 | B1 | * | 6/2002 | Kivela et al. | 345/212 |
| 6,473,078 | B1 | | 10/2002 | Ikonen et al. | |
| 6,593,975 | B1 | | 7/2003 | Oh | |
| 6,763,060 | B1 | | 7/2004 | Knapp | |
| 6,952,786 | B2 | | 10/2005 | Kim et al. | |
| 7,050,049 | B2 | | 5/2006 | Byun | |
| 7,116,322 | B2 | | 10/2006 | Ko et al. | |
| 7,283,180 | B2 | | 10/2007 | Choi | |
| 7,317,451 | B2 | | 1/2008 | Kim | |
| 7,330,170 | B2 | | 2/2008 | Hwang | |
| 2007/0152994 | A1 | | 7/2007 | Koh | |

FOREIGN PATENT DOCUMENTS

| | | | |
|---|---|---|---|
| JP | 6-216753 | | 8/1994 |
| JP | 06-216753 | A | 8/1994 |
| JP | 7-86913 | | 3/1995 |
| JP | 07-086913 | A | 3/1995 |
| JP | 8-46508 | | 2/1996 |
| JP | 08-046508 | A | 2/1996 |
| JP | 9-34600 | | 2/1997 |
| JP | 09-034600 | A | 2/1997 |
| JP | 9-116419 | | 5/1997 |
| JP | 09-116419 | A | 5/1997 |
| JP | 10222134 | | 8/1998 |
| KR | 95-9401 | | 4/1995 |
| KR | 1019950012066 | | 10/1995 |
| KR | 10-2000-0014648 | A | 3/2000 |
| KR | 10-2001-0081267 | A | 8/2001 |

OTHER PUBLICATIONS

"Display Power Management Signaling (DPMS) Standard", Video Electronics Standards Association, Aug. 20, 1993, pp. 1-12.

* cited by examiner

POWER-SAVING CIRCUIT AND METHOD FOR A DIGITAL VIDEO DISPLAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CLAIM OF PRIORITY]

[This application makes reference to, incorporates the same herein, and claims all benefits accruing under 35 U.S.C. §119 from an application entitled A POWER-SAVING CIRCUIT IN A DIGITAL VIDEO SIGNAL DISPLAY SYSTEM earlier filed in the Korean Industrial Property Office on the day of Sep. 29, 2000, and there duly assigned Serial No. 2000-57445.]

*CROSS-REFERENCE TO RELATED APPLICATIONS*

*This application is a continuation reissue application of U.S. patent application Ser. No. 11/171,651, filed on Jul. 1, 2005 now U.S. Pat. No. Re. 43,202, which is a reissue application of U.S. Pat. No. 6,587,101, issued on Jul. 1, 2003 from U.S. patent application Ser. No. 09/817,145, filed on Mar. 27, 2001, which claims the benefit under 35 U.S.C. §119(a) of Korean Patent Application No. 2000-57445, filed on Sep. 29, 2000, the entire content of all of said prior applications and patent being hereby incorporated by reference.*

BACKGROUND OF THE INVENTION

1. Technical Field

The present invention relates to a power-saving circuit for a digital video display device, and more particularly to a power-saving circuit for a digital video display device for detecting whether a transmission minimized differential signaling (TMDS) clock signal is input and performing a power-saving mode according to the detection result.

2. Description of the Related Art

In general, an analog video display device employing a cathode ray tube (CRT) and a digital video display device employing a liquid crystal display (LCD) are widely used for a desktop computer and a portable computer, respectively, wherein the digital video display device employs an analog interface mode and a digital interface mode.

The digital video display device of the analog interface mode has an advantage capable of being directly substituted for the existing analog video display device, whereas the digital video display device of the digital interface mode has an advantage capable of being simple and facilitating the impedance match, so that most portable computers employ the digital video display device of the digital interface mode.

With reference to FIG. 1, FIG. 1 illustrates a power saving circuit 100 of a conventional digital video display device. Operation of the digital video display device of a conventional digital interface mode will be schematically described with reference to FIG. 1 as follows.

In general, graphic card built in a computer main body compresses and encodes horizontal/vertical synchronous signals and a digital video signal into a TMDS data signal and outputs the TMDS data signal to the digital video display device together with a TMDS clock signal. A TMDS driving unit 10 of the digital video display device decompresses the TMDS data signal Data received on line 6, along with a clock signal Clock on line 2 and outputs the horizontal/vertical synchronous signals Hsync and Vsync and the digital video signal DE.

A TMDS signal conversion method is a technology of decoding high-speed serial data received at a receiving side as parallel data and then encoded into the high-speed serial data to be transmitted from a transmitting side, which is widely used in the digital video display device.

The horizontal/vertical synchronous signals Hsync/Vsync and the digital video signal DE output from the TMDS driving unit 10 are input into a display driving unit 12, so that the display driving unit 12 drives a gate driver and a source driver. At this time, a controller 14 carries out a power-saving mode in accordance with whether the horizontal/vertical synchronous signals Hsync/Vsync input from the TMDS driving unit 10 exist.

Since a TMDS signal input to the TMDS driving unit 10 from outside the TMDS driving unit 10 is of a high frequency and a small amplitude, it is difficult for the controller 14 to directly recognize whether the TMDS signal is input. In general, the controller 14 receives the horizontal/vertical synchronous signals Hsync/Vsync output from the TMDS driving unit 10 and indirectly determines whether the TMDS signal is input. That is, if the controller 14 does not receive the horizontal/vertical synchronous signals Hsync/Vsync from the TMDS driving unit 10, the controller 14 enables the digital video display device to carry out a power-saving mode and the controller 14 supplies a power saving signal PS to a power supply unit 16. When the controller 14 receives the horizontal/vertical synchronous signals Hsync/Vsync, the controller 14 enables the video display device to return to a normal mode. The power supply unit 16 supplies an appropriate voltage Vcc to the TMDS driving unit 10, the controller 14 and to display driving unit 12. In order for the controller 14 to determine whether the TMDS signal is input through the TMDS driving unit 10, electric power should be supplied all the time to the controller 14 and the TMDS driving unit 14, even in a power-saving mode.

However, since, in the conventional digital video display device, such as illustrated in FIG. 1, the controller 14 and the TMDS driving unit 10 should be supplied with electric power all the time even in a power-saving mode as stated above, there is a problem in that the power consumption is increased when using the standard of the display power management system (DPMS) of the Video Electronics Standard Association (VESA) for video electronic equipment.

SUMMARY OF THE INVENTION

In order to solve the above stated problem, it is an object of the present invention, among other objects of the present invention, to provide a power-saving circuit for a digital video display device capable of satisfying the DPMS standards through the reduction of electric power consumption in a power-saving mode by detecting whether a TMDS clock signal is input, carrying out a power-saving mode according to the detection result, and stopping the driving of respective components including the TMDS driving unit during the power-saving mode operation.

In order to achieve the above object, and other objects of the present invention, an embodiment of a power-saving circuit according to the present invention includes: a TMDS driving unit for converting a TMDS data signal input together with a TMDS clock signal to the TMDS driving unit into horizontal/vertical synchronous signals and a digital video signal based on a TMDS signal conversion mode; a display driving unit for driving a display unit based on the horizontal/vertical synchronous signals and the digital video signal input to the display driving unit from the TMDS driving unit; a clock signal detecting unit for outputting a first level of a clock detecting signal when the TMDS clock signal is not input to the TMDS driving unit and outputting a second level of the clock detecting signal when the TMDS clock signal is input to the TMDS driving unit; a controller for outputting a first level of a power-saving signal when the first level of the clock detecting signal is input to the controller from the clock signal detecting unit, and outputting a second level of the power-saving signal when the second level of clock detecting signal is input to the controller from the clock signal detecting unit; and a power supply unit for supplying a voltage to the TMDS driving unit, the controller, the clock signal detecting unit and the display driving unit, for cutting off the supply of the voltage except to the controller and the clock signal detecting unit when the first level of the power-saving signal is input to the power supply unit from the controller, and for providing the supply of the voltage to the TMDS driving unit, the controller, the clock signal detecting unit and the display driving unit when the second level of the power-saving signal is input to the power supply unit from the controller.

In order to achieve the above object and other objects of the present invention, another embodiment of a power-saving circuit according to the present invention includes: a TMDS driving unit for converting a TMDS data signal input together with a TMDS clock signal to the TMDS driving unit into horizontal/vertical synchronous signals and a digital video signal based on a TMDS signal conversion mode, the TMDS driving unit stopping driving an operation for signal converting when a first level of a power-down signal is input to the TMDS driving unit, and the TMDS driving unit starting the driving of the operation for signal converting when a second level of the power-down signal is input to the TMDS driving unit; a display driving unit for driving a display unit based on the horizontal/vertical synchronous signals and the digital video signal input to the display driving unit from the TMDS driving unit; a clock signal detecting unit for outputting a first level of a clock detecting signal when the TMDS clock signal is not input to the TMDS driving unit, and outputting a second level of the clock detecting signal when the TMDS clock signal is input to the TMDS driving unit; a controller for outputting the first level of the power-down signal to the TMDS driving unit and also for outputting a first level of a power-saving signal when the first level of clock detecting signal is input to the controller from the clock signal detecting unit, and for outputting the second level of the power-down signal to the TMDS driving unit and for outputting a second level of the power-saving signal when the second level of the clock detecting signal is input to the controller from the clock signal detecting unit; and a power supply unit for supplying a voltage to the TMDS driving unit, the controller, the clock signal detecting unit and the display driving unit, the power supply unit for cutting off the supply of the voltage except to the controller, the clock signal detecting unit and the TMDS driving unit when the first level of the power-saving signal is input to the power supply unit from the controller, and the power supply unit for providing the supply of the power to the TMDS driving unit, the controller, the clock signal detecting unit and the display driving unit when the second level of the power-saving signal is input to the power supply unit from the controller.

In order to achieve the above object and other objects of the present invention, a further embodiment of a power-saving circuit according to the present invention includes: a TMDS driving unit for converting a TMDS data signal input together with a TMDS clock signal to the TMDS driving unit into horizontal/vertical synchronous signals and a digital video signal based on a TMDS signal conversion mode; a display driving unit for driving a display unit based on the horizontal/vertical synchronous signals and the digital video signal input to the display driving unit from the TMDS driving unit; a clock signal detecting unit for outputting a first level of a clock detecting signal when the TMDS clock signal is not input to the TMDS driving unit, and for outputting a second level of the clock detecting signal when the TMDS clock signal is input to the TMDS driving unit; and a power supply unit for supplying a voltage to the TMDS driving unit, the clock signal detecting unit and the display driving unit, for cutting off the supply of the voltage to the TMDS driving unit and the display driving unit, but not to the clock signal detecting unit, when the first level of clock detecting signal is input to the power supply unit from the clock signal detecting unit, and for providing the supply of the voltage to the TMDS driving unit, the clock signal detecting unit and the display driving unit when the second level of the clock detecting signal is input to the power supply unit from the clock signal detecting unit.

In order to achieve the above object and other objects of the present invention, a still further embodiment of a power-saving circuit according to the present invention includes: a TMDS driving unit for converting a TMDS data signal input together with a TMDS clock signal to the TMDS driving unit into horizontal/vertical synchronous signals and a digital video signal based on a TMDS signal conversion mode, the TMDS driving unit stopping driving of an operation for signal converting when a first level of a clock detecting signal is input to the TMDS driving unit, and the TMDS driving unit starting the driving of the operation for signal converting when a second level of the clock detecting signal is input to the TMDS driving unit; a display driving unit for driving a display unit based on the horizontal/vertical synchronous signals and the digital video signal input to the display driving unit from the TMDS driving unit; a clock signal detecting unit for outputting to the TMDS driving unit the first level of clock detecting signal when the TMDS clock signal is not input the TMDS driving unit, and for outputting the second level of the clock detecting signal to the TMDS driving unit when the TMDS clock signal is input to the TMDS driving unit; and a power supply unit for supplying a voltage to the TMDS driving unit, the clock signal detecting unit and the display driving unit, for cutting off the supply of a voltage except to the TMDS driving unit and the clock signal detecting unit when the first level of the clock detecting signal is input to the power supply unit from the clock signal detecting unit, and for providing the supply of the voltage to the TMDS driving unit, the clock signal detecting unit and to the display driving unit when the second level of the clock detecting signal is input to the power supply unit from the clock signal detecting unit.

Accordingly, the present invention promotes satisfaction of the DTMS standards through the reduction of the power consumption by detecting whether a TMDS clock signal is input to the TMDS driving unit, carrying out a power-saving mode according to the detection result, and stopping the driving of the respective components including the driving of an operation for signal converting in the TMDS driving unit during the operation in the power-saving mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The power-saving circuits according to embodiments of the present invention will now be described in detail with reference to the accompanying drawings, particularly FIGS. 2 through 6.

Figure 1:
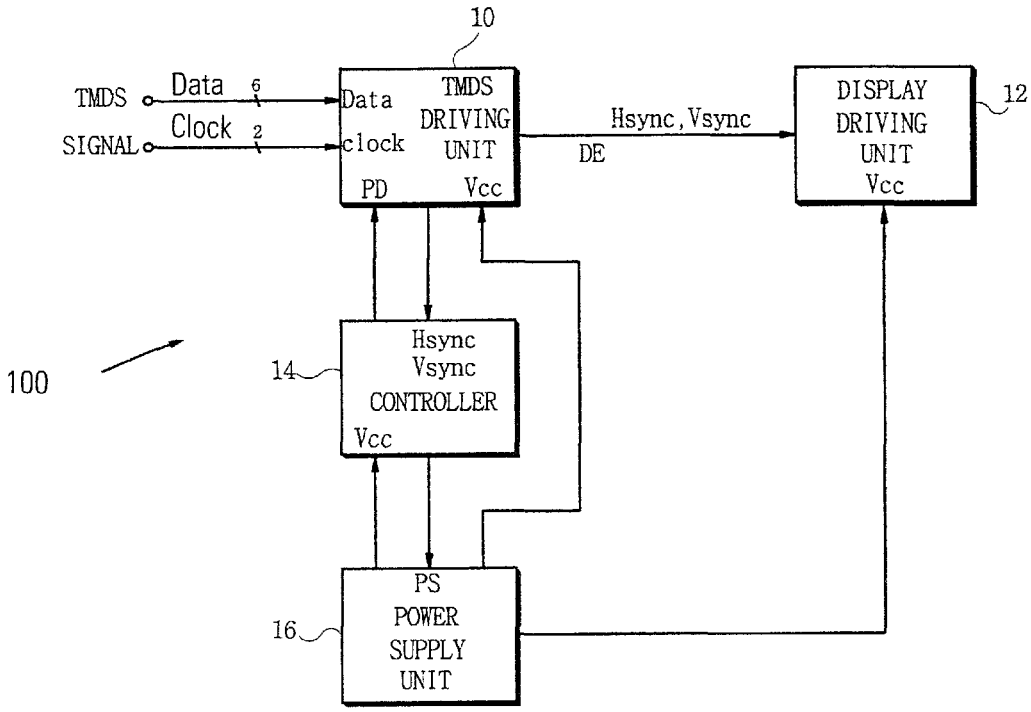
FIG.1 (PRIOR ART)
FIG. 1 is a view illustrating a power-saving circuit of a conventional digital video display device.
Figure 2:
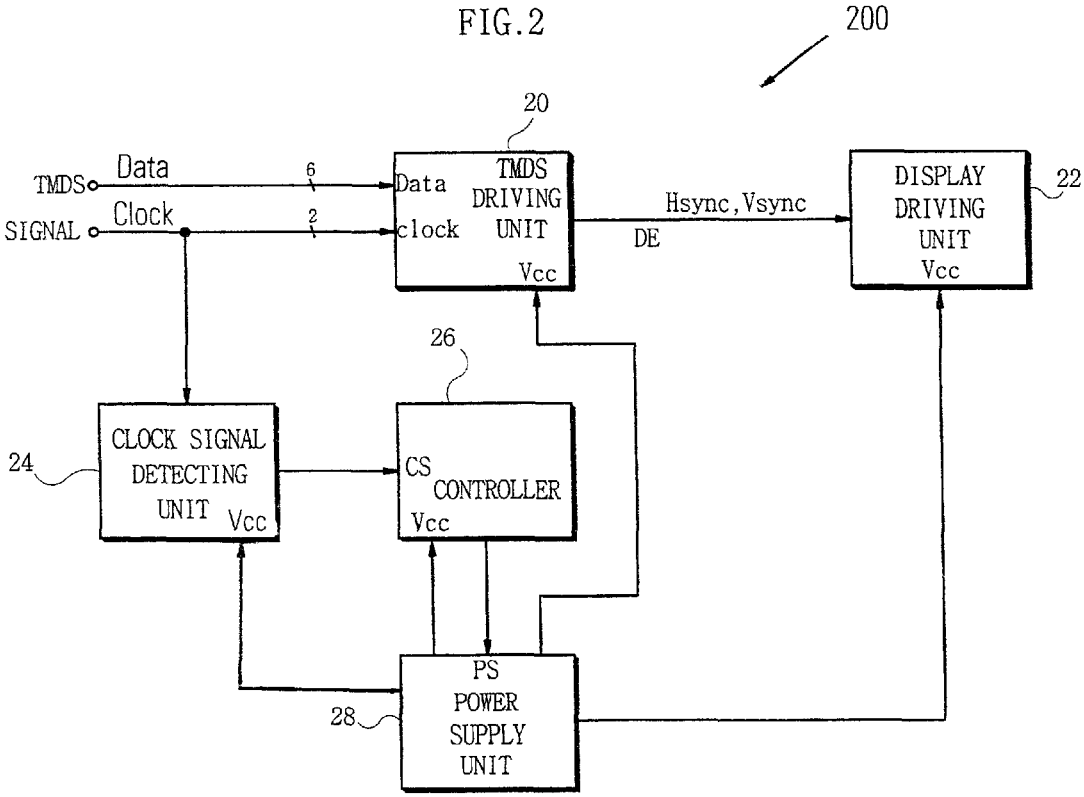
FIG. 2 is a view illustrating a power-saving circuit of a digital video display device according to a first embodiment of the present invention.
Figure 3:
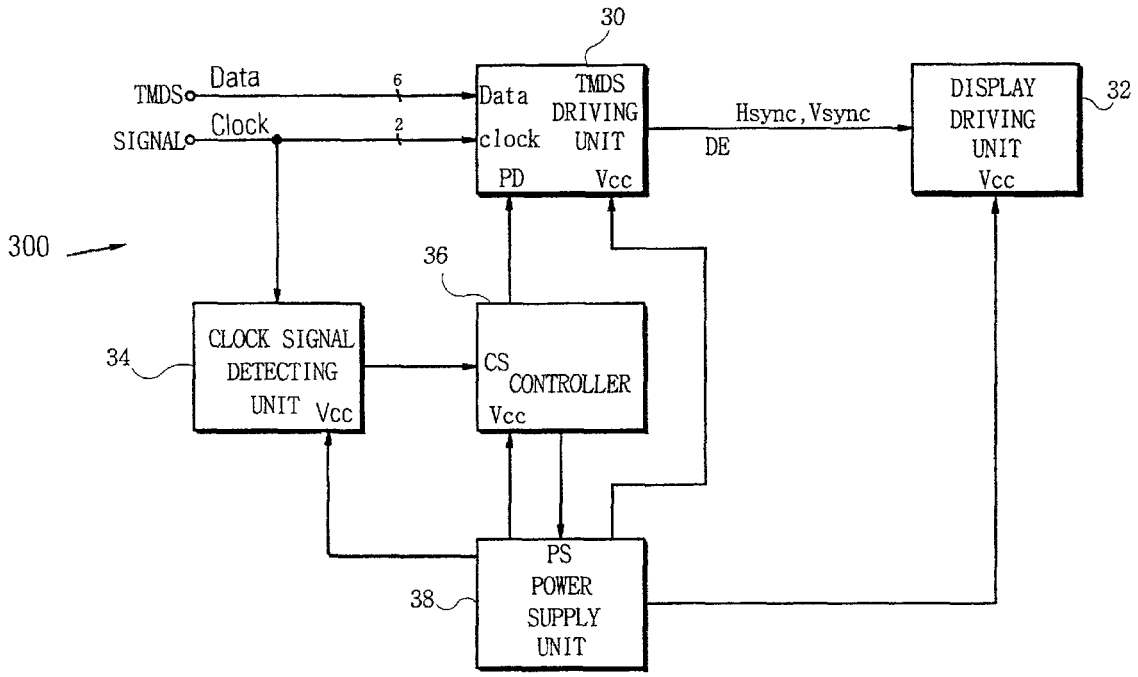
FIG. 3 is a view illustrating a power-saving circuit of a digital video display device according to a second embodiment of the present invention.
Figure 4:
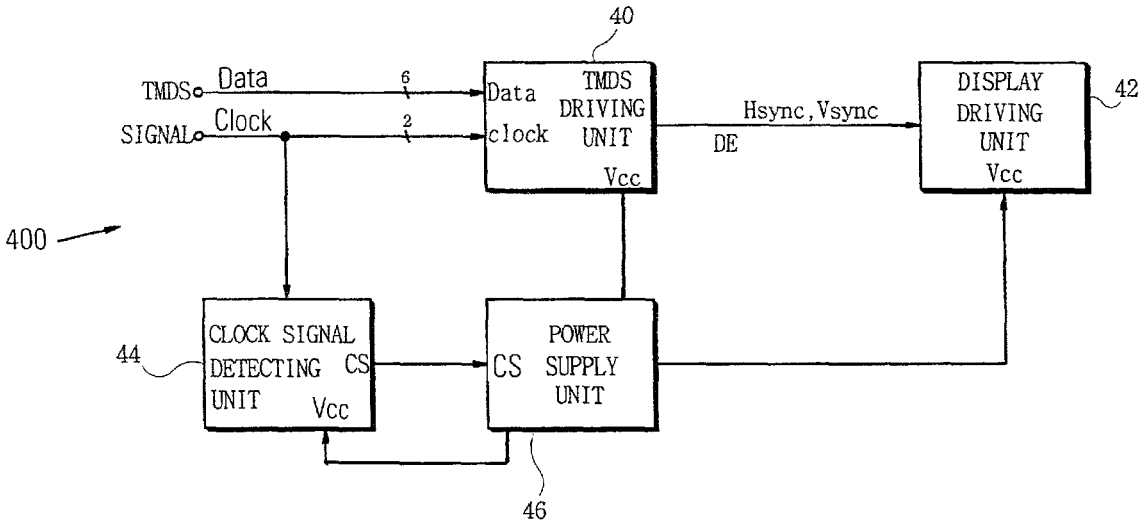
FIG. 4 is a view illustrating a power-saving circuit of a digital video display device according to a third embodiment of the present invention.
Figure 5:
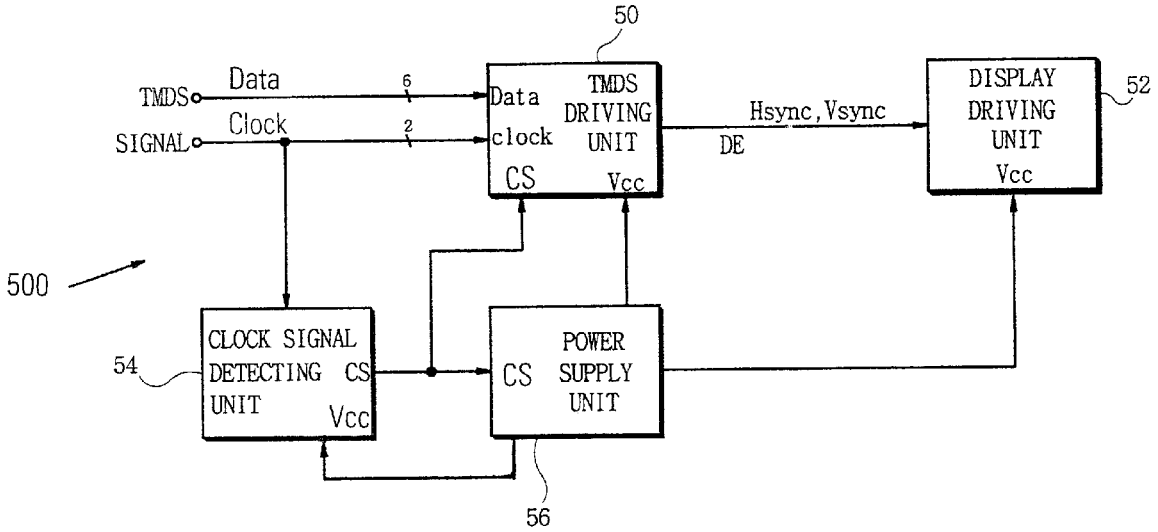
FIG. 5 is a view illustrating a power-saving circuit of a digital video display device according to a fourth embodiment of the present invention.
Figure 6:
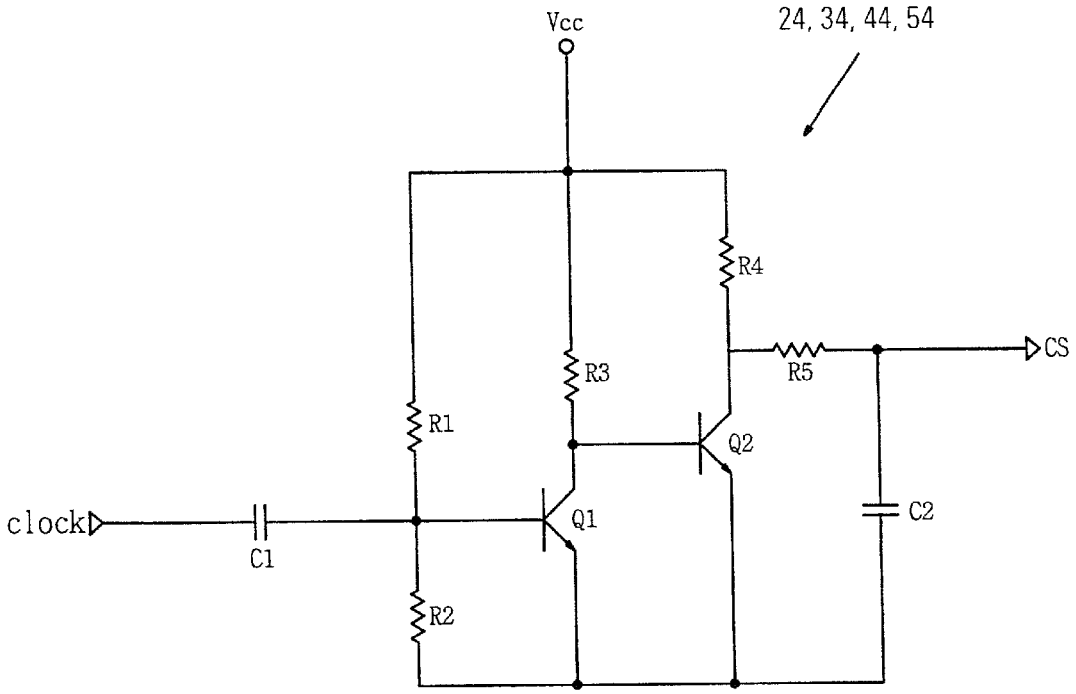
FIG. 6 is a view illustrating in detail a clock signal detecting unit shown in FIGS. 2, 3, 4 and 5.

FIG. 2 is a view illustrating for showing a power-saving circuit 200 of a digital video display device according to a first embodiment of the present invention, FIG. 3 is a view illustrating a power-saving circuit 300 of a digital video display device according to a second embodiment of the present invention, FIG. 4 is a view illustrating a power-saving circuit 400 of a digital video display device according to a third embodiment of the present invention, FIG. 5 is a view illustrating a power-saving circuit 500 of a digital video display device according to a fourth embodiment of the present invention, and FIG. 6 is a view illustrating in detail a clock signal detecting unit shown in FIGS. 2, 3, 4, and 5.

Referring to FIG. 2, a first embodiment of the present invention of the power-saving circuit 200 includes a TMDS driving unit 20 for converting into horizontal/vertical signals Hsync/Vsync, and a digital video signal DE a TMDS data signal Data on line 6 input together with a TMDS clock signal Clock on line 2 to the TMDS driving unit 20 based on the TMDS signal conversion mode. The power-saving circuit 200 also includes a display driving unit 22 for driving a display unit based on the horizontal/vertical synchronous signals and the digital video signal input to the display driving unit 22 from the TMDS driving unit 20. Further, the power-saving circuit 200 includes a clock signal detecting unit 24 for outputting a first level of a clock detecting signal CS when the TMDS clock signal Clock is not input to the TMDS driving unit 20 and outputting a second level of the clock detecting signal CS when the TMDS clock signal Clock is input to the TMDS driving unit 20. The power-saving circuit 200 also includes a controller 26 for outputting a first level of a power-saving signal PS when the first level of the clock detecting signal CS is input to the controller 26 from the clock signal detecting unit 24 and outputting a second level of the power-saving signal PS when the second level of the clock detecting signal CS is input to the controller 26 from the clock signal detecting unit 24. The power-saving circuit 200 further includes a power supply unit 28 for cutting off a supply of a voltage Vcc to the TMDS driving unit 20 and the display unit 22, except for the controller 26 and the clock signal detecting unit 24, when the first level of the power-saving signal PS is input to the power supply unit 28 from the controller 26, and for supplying the voltage Vcc to the TMDS driving unit 20, the display driving unit 22, the controller 26 and the clock signal detecting unit 24 when the second level of the power-saving signal PS is input to the power supply unit 28 from the controller 26, during the power supply unit 28 supplying of the voltage Vcc to the respective components of the power-saving circuit 200.

Referring to FIG. 3, a second embodiment of the present invention of the power-saving circuit 300 includes a TMDS driving unit 30 for converting into horizontal/vertical synchronous signals Hsync/Vsync and a digital video signal DE a TMDS data signal Data on line input together with a TMDS clock signal Clock on line 2 to the TMDS driving unit 30 based on the TMDS signal conversion mode, the TMDS driving unit 30 stopping the driving of an operation for signal converting when a first level of a power-down signal PD is input to the TMDS driving unit 30, and the TMDS driving unit 30 starting the driving of the operation for signal converting when a second level of the power-down signal PD is input the to TMDS driving unit 30. The power-saving circuit 300 further includes a display driving unit 32 for driving a display unit based on the horizontal/vertical synchronous signals and the digital video signal input to the display driving unit 32 from the TMDS driving unit 30. The power-saving circuit 300 further includes a clock signal detecting unit 34 for outputting a first level of a clock detecting signal CS when the TMDS clock signal Clock is not input to the TMDS driving unit 30, and for outputting a second level of the clock detecting signal CS when the TMDS clock signal Clock is input the TMDS driving unit 30. The power-saving circuit 300 also includes a controller 36 for outputting a first level of a power-saving signal PS to a power supply unit 38 at the same time with outputting the first level of the power-down signal PD to the TMDS driving unit 30 when the first level of the clock detecting signal CS is input to controller 36 from the clock signal detecting unit 34, and the controller 36 outputting a second level of the power-saving signal PS to the power supply unit 38 at the same time with outputting the second level of the power-down signal PD to the TMDS driving unit 30 when the second level of clock detecting signal CS is input from the clock signal detecting unit 34. The power-saving circuit 300 additionally includes the power supply unit 38 for supplying a voltage Vcc to the TMDS driving unit 30, the controller 36, the clock signal detecting unit 34 and the display driving unit 32, the power-supply unit 38 cutting off the supply of the voltage Vcc to the display driving unit 32, but not to the controller 36, the clock signal detecting unit 34 and the TMDS driving unit 30, when the first level of the power-saving signal PS is input to the power supply unit 38 from the controller 26, and the power supply unit 38 providing the supply of the voltage Vcc to the TMDS driving unit 30, the controller 36, the clock signal detecting unit 34 and the display driving unit 32 when the second level of the power-saving signal PS is input from the controller 36 to the power supply unit 38.

Referring now to FIG. 4, a third embodiment of the present invention of the power-saving circuit 400 includes a TMDS driving unit 40 for converting a TMDS data signal Data on line input together with a TMDS clock signal Clock on line 2 to the TMDS driving unit 40 into horizontal/vertical synchronous signals Hsync/Vsync and a digital video signal DE based on the TMDS signal conversion mode. The power-saving circuit 400 also includes a display driving unit 42 for driving a display unit based on the horizontal/vertical synchronous signals and the digital video signal input to the display driving unit 42 from the TMDS driving unit 40. The power-saving circuit 400 also includes a clock signal detecting unit 44 for outputting a first level of a clock detecting signal CS when the TMDS clock signal Clock is not input to the TMDS driving unit 40, and for outputting a second level of the clock detecting signal CS when the TMDS clock signal Clock is input to the TMDS driving unit 40. The power-saving circuit 400 additionally includes a power supply unit 46 for supplying a voltage Vcc to the TMDS driving unit 40, the clock signal detecting unit 44 and the display driving unit 42, the power supply unit 46 cutting off the supply of the voltage Vcc to the TMDS driving unit 40 and the display driving unit 42 when the first level of the clock detecting signal CS is input to the power supply unit 46 from the clock signal detecting unit 44, and the power supply unit 46 providing the supply of the voltage Vcc to the TMDS driving unit 40, the clock signal detecting unit 44 and the display driving unit 42 when the second level of the clock detecting signal CS is input to the power supply unit 46 from the clock signal detecting unit 44.

Referring to FIG. 5, a fourth embodiment of the present invention of a power-saving circuit 500 includes a TMDS driving unit 50 for converting a TMDS data signal Data on line 6 input together with a TMDS clock signal Clock on line 2 to the TMDS driving unit 50 into horizontal/vertical synchronous signals Hsync/Vsync and a digital video signal DE based on the TMDS signal conversion mode, the TMDS driving unit 50 stopping the driving of an operation for signal converting when a first level of a clock detecting signal CS is input to the TMDS driving unit 50 from a clock signal detecting unit 54, and the TMDS driving unit 50 starting the driving of the operation for signal converting when a second level of the clock detecting signal CS is input to the TMDS driving unit 50 from the clock signal detecting unit 54. The power-saving circuit 500 further includes a display driving unit 52 for driving a display unit based on the horizontal/vertical synchronous signals and the digital video signal input to the display driving unit 52 from the TMDS driving unit 50. The power-saving circuit 500 additionally includes the clock signal detecting unit 54 for outputting the first level of the clock detecting signal CS to the TMDS driving unit 50 when the TMDS clock signal Clock is not input to the TMDS driving unit 50, and the clock signal detecting unit 54 for outputting the second level of the clock detecting signal CS to the TMDS driving unit 50 when the TMDS clock signal Clock is input to the TMDS driving unit 50. The power-saving circuit 500 also includes a power supply unit 56 for supplying a voltage Vcc to the TMDS driving unit 50, the clock signal detecting unit 54 and the display driving unit 52, the power supply unit 56 for cutting off the supply of the voltage Vcc to the display driving unit 52, but not to the TMDS driving unit 50 and the clock signal detecting unit 54, when the first level of the clock detecting signal CS is input to the power supply unit 56 from the clock signal detecting unit 54, and the power supply unit 56 providing the supply of the voltage Vcc to the TMDS driving unit 50, the clock signal detecting unit 54 and the display driving unit 52, when the second level of the clock detecting signal CS is input to the power supply unit 56 from the clock signal detecting unit 54.

Referring now to FIG. 6, FIG. 6 illustrates a circuit diagram of the clock signal detecting units 24, 34, 44, and 54 according to the present invention. The clock signal detecting unit circuitry of FIG. 6 includes a capacitor C1 for removing direct current (DC) components of the TMDS clock signal Clock. The clock signal detecting unit circuitry of FIG. 6 also includes an amplifying transistor Q1 connected to the capacitor C1 for amplifying the DC component-removed TMDS clock signal Clock to provide an amplified signal, resistors R1 and R2 connected to the base of the amplifying transistor Q1 for biasing the base of the amplifying transistor Q1; a resistor R3 connected to the collector of the amplifying transistor Q1 for biasing the collector of the amplifying transistor Q1. The clock signal detecting unit circuitry of FIG. 6 also includes a switching transistor Q2 whose base is connected to the collector of amplifying transistor Q1 and to the resistor R3 and whose emitter is connected to the emitter of the amplifying transistor Q1, the switching transistor Q2 being switched by the amplified signal from the amplifying transistor Q1 to output a low level signal or a high level signal through the collector of the switching transistor Q2, the low level signal corresponding to the first level of the clock detecting signal CS and the high level signal corresponding to the second level of the clock detecting signal CS. The clock signal detecting unit circuitry of FIG. 6 also includes a resistor R4 connected to the collector of the switching transistor Q2 for biasing the collector of the switching transistor Q2, and a capacitor C2 connected to the emitter of the switching transistor Q2, and a resistor R5 connected to the capacitor C2 and to the collector of the switching transistor Q2, the capacitor C2 and the resistor R5 for smoothing an output signal of the switching transistor Q2, the output signal of the switching transistor Q2 corresponding to one of the first level of the clock detecting signal CS or the second level of the clock detecting signal CS.

The method and operation of the power-saving circuits 200, 300, 400, and 500 according to the respective embodiments of the present invention will now be described with reference to FIGS. 2 through 6. In this regard, it is noted that the first and second embodiments of the power-saving circuits 200 and 300 are related to power-saving circuits with a controller, and the third and fourth embodiments of the power-saving circuits 400 and 500 are related to power-saving circuits without a controller.

In general, a graphic card built in a computer main body compresses and encodes horizontal/vertical synchronous signals and a digital video signal into a TMDS data signal Data to be output to a digital video display device together with a TMDS clock signal Clock.

Accordingly, referring first to the embodiment of the power-saving circuit 200 of FIG. 2, the TMDS driving unit 20 of the digital video display device converts a TMDS data signal Data input together with the TMDS clock signal Clock into horizontal/vertical synchronous signals Hsync/Vsync and a digital video signal DE based on a TMDS signal conversion mode to be output to the display driving unit 22. The display driving unit 22 displays images on a liquid crystal display screen by driving a gate driver and a source driver based on the horizontal/vertical synchronous signals and the digital video signal.

The clock signal detecting unit 24 outputs the first level of the clock detecting signal CS to the controller 26 when the TMDS clock signal Clock is not input to the TMDS driving unit and outputs the second level of the clock detecting signal CS to the controller 26, when the TMDS clock signal Clock is input to the TMDS driving unit 20 from the computer main body.

Referring now to FIG. 6 for a more detailed description of the operation of the clock signal detecting unit 24, as well as of the operation of the clock signal detecting units 34, 44 and 54 of the respective embodiments of the power-saving circuits 300, 400, and 500 of FIGS. 3 through 5, the TMDS clock signal Clock input from an external computer main body passes through the capacitor C1 to remove any DC component in the TMDS clock signal Clock, and the DC component-removed TMDS clock signal Clock is amplified through the transistor Q1 to provide an amplified signal. The transistor Q2 is switched based on the amplified signal from the transistor Q1, so that a low level or a high level of the clock detecting signal CS is output through the collector of the transistor Q2. The output clock detecting signal CS of the switching transistor Q2 is rectified through the capacitor C2 and the resistor R5 and input into the controller 26 of the power-saving circuit 200. Similarly, in this regard, the clock detecting signal CS from the clock signal detecting unit 34 in the power-saving circuit 300 is obtained and provided to the controller 36, the clock detecting signal CS from the clock signal detecting unit 44 in the power-saving circuit 400 is obtained and provided to the power supply unit 46, and the clock detecting signal CS from the clock signal detecting unit 54 in the power-saving circuit 500 is obtained and provided to the power supply unit 56 and to the TMDS driving unit 50.

Continuing the reference to the power-saving circuit 200 of FIG. 2, the controller 26 outputs the first level of the power-saving signal PS to the power supply unit 28 for carrying out a power-saving mode when the first level of the clock detecting signal CS is input to the controller 26 from the clock signal detecting unit 24, and outputs the second level of the power-saving signal PS to the power supply unit 28 for restoring a normal mode when the second level of the clock detecting signal CS is input to the controller 26 from the clock signal detecting unit 24.

Accordingly, in the embodiment of the power-saving circuit 200 of FIG. 2, the power supply unit 28 supplies the voltage Vcc to the respective components, including the controller 26, the TMDS driving unit 20, the clock signal detecting unit 24 and the display unit 22, carries out the power-saving mode by cutting off the supply of the voltage Vcc to the respective components, including to the TMDS driving unit 20 and the display driving unit 22, but not to the controller 26 and the clock signal detecting unit 24, when the first level of the power-saving signal PS is input to the power supply unit 28 from the controller 26, and the power supply unit 28 providing the supply of the voltage Vcc to the respective components, including the controller 26, the TMDS driving unit 20, the clock signal detecting unit 24 and the display driving unit 22 when the second level of the power-saving signal PS is input to the power supply unit 28 from the controller 26.

Continuing now with reference to the operation of the power-saving circuit 300 of FIG. 3, the operation of the TMDS driving unit 30, the clock signal detecting unit 34 and the display driving unit 32 are similar respectively to the above-described operation of the TMDS driving unit 20, the clock signal detecting unit 24 and the display driving unit 22 in the first embodiment of FIG. 2 in the normal mode.

In the power-saving circuit 300, the clock signal detecting unit 34 outputs the first level of the clock detecting signal CS to the controller 36 when the TMDS clock signal Clock is not input to the TMDS driving unit 30 from the computer main body, and the clock signal detecting unit outputs the second level of clock detecting signal CS to the controller 36 when the TMDS clock signal Clock is input to the TMDS driving unit 30 from the computer main body.

Also, in the power-saving circuit 300 of FIG. 3, the controller 36 outputs the first level of power-down signal PD to the TMDS driving unit 30 for carrying out the power-saving mode at the same time with outputting the first level of power-saving signal PS to the power supply unit when the first level of clock detecting signal CS is input to the controller 36 from the clock signal detecting unit 34, and the controller 36 outputs the second level of power-down signal PD to the TMDS driving unit 30 for restoring the normal mode at the same time with outputting the second level of power-saving signal PS to the power supply unit 38 when the second level of clock detecting signal CS is input to the controller 36 from the clock signal detecting unit 34.

Accordingly, in the power-saving circuit 300 of FIG. 3, the power supply unit 38 supplies the voltage Vcc to respective components, including to the TMDS driving unit 30, the controller 36, the clock signal detecting unit 34 and the display driving unit 32, and the power supply unit 38 carries out the power-saving mode by cutting off the supply of the voltage Vcc to at least the display driving unit 32, but not to the controller 36, the clock signal detecting unit 34 and the TMDS driving unit 30, when the first level of power-saving signal PS is input to the power supply unit 38 from the controller 36, and the power supply unit 38 provides the supply of the voltage Vcc for restoring the normal mode to the display driving unit 32, when the second level of power-saving signal PS is input to the power supply unit 38 from the controller 36.

Further, in the power-saving circuit 300 of FIG. 3, the TMDS driving unit 30 converts the TMDS data signal Data input together with the TMDS clock signal Clock to the TMDS driving unit 30 into the horizontal/vertical synchronous signals Hsync/Vsync and the digital video signal DE based on the TMDS signal conversion mode, and the TMDS driving unit 30 outputs the horizontal/vertical synchronous signals and the digital video signal to the display driving unit 32. Also the TMDS driving unit 30 stops the driving of an operation for signal converting when the first level of power-down signal PD is input to the TMDS driving unit 30 from the controller 36, and the TMDS driving unit 30 starts the driving of the operation for signal converting when the second level of the power-down signal PD is input to the TMDS driving unit 30 from the controller 36.

Continuing with reference to the operation of the power-saving circuit 400 of FIG. 4, the operation of the TMDS driving unit 40, the display driving unit 42 and the clock signal detecting unit 44 are similar respectively to the above described operation of the TMDS driving unit 20, the display unit 22, and the clock signal detecting unit 24 in the first embodiment of FIG. 2 in the normal mode. In the power-saving circuit 400 of FIG. 4, the clock signal detecting unit 44 outputs the first level of clock detecting signal CS to the power supply unit 46 when the TMDS clock signal Clock is not input to the TMDS driving unit 40 from the computer main body, and the clock signal detecting unit 44 outputs the second level of clock detecting signal CS to the power supply unit 46 when the TMDS clock signal Clock is input to the TMDS driving unit 40 from the computer main body.

Accordingly in the power-saving circuit 400 of FIG. 4, the power supply unit 46 supplies the voltage Vcc to the respective components, including to the TMDS driving unit 40, the clock signal detecting unit 44 and the display driving unit 42, the power supply unit 46 cutting off the supply of all the voltage Vcc to the TMDS driving unit 40 and the display driving unit 42, but not to the clock signal detecting unit 44, for the power-saving mode when the first level of clock detecting signal CS is input to the power supply unit 46 from the clock signal detecting unit 44, and the power supply unit 48 provides the supply of all the voltage Vcc to the to the TMDS driving unit 40, the clock signal detecting unit 44 and the display driving unit 42 for restoring the normal mode when the second level of clock detecting signal CS is input to the power-supply unit 46 from the clock signal detecting unit 44.

Continuing with reference to the operation of the power-saving circuit 500 of FIG. 5, the operation of the TMDS driving unit 50, the clock signal detecting unit 54 and the display driving unit 52 are similar respectively to the above-described operation of the TMDS driving unit 20, the display driving unit 22, and the clock signal detecting unit 24 of the first embodiment of FIG. 2 in the normal mode. In the power-saving circuit 500 of FIG. 5, the clock signal detecting unit 54 outputs the first level of clock detecting signal CS to the TMDS driving unit 50 and to the power supply unit 56 when the TMDS clock signal Clock is not input to the TMDS driving unit 50 from the computer main body, and the clock signal detecting unit 54 outputs the second level of clock detecting signal CS to the TMDS driving unit 50 and to the power supply unit 56 when the TMDS clock signal Clock is input to the to the TMDS driving unit 50 from the computer main body.

Accordingly, in the power-saving circuit 500 of FIG. 5, the power supply unit 56 supplies the voltage Vcc to at least to the TMDS driving unit 50, the clock signal detecting unit 54 and to the display driving unit 52, the power supply unit 56 cutting off the supply of the voltage Vcc to at least the display driving unit 52, but not to the TMDS driving unit 50 and the clock signal detecting unit 54, for performing the power-saving mode when the first level of clock detecting signal CS is input to the power supply unit 56 from the clock signal detecting unit 54, and the power supply unit 56 provides the supply of all the voltage Vcc including to the TMDS driving unit 50, the clock signal detecting unit 54 and the display driving unit 52, for restoring the normal mode when the second level of clock detecting signal CS is input to the power supply unit 56 from the clock signal detecting unit 54.

Further, in the power-saving circuit 500 of FIG. 5, the TMDS driving unit 50 converts the TMDS data signal Data input together with the TMDS clock signal Clock to the TMDS driving unit 50 into the horizontal/vertical synchronous signals Hsync/Vsync and the digital video signal DE based on the TMDS signal conversion mode, and the TMDS driving unit 50 outputs the horizontal/vertical synchronous signals and the digital video signal to the display driving unit 52. Also the TMDS driving unit 50 stops the driving of the operation for signal converting when the first level of clock detecting signal CS is input to the to the TMDS driving unit 50 from the clock signal detecting unit 54, and the TMDS driving unit 50 starts the driving of the operation for signal converting when the second level of clock detecting signal CS is input to the TMDS driving unit 50 from the clock signal detecting unit 54.

As discussed above, the power-saving circuits according to the present invention, such as power-saving circuits 200, 300, 400 and 500 of FIGS. 2 through 5, detect whether the TMDS clock signal is input, carry out the power-saving mode according to the detection result, and stop the driving of the respective components including the TMDS driving unit in the operation of the power-saving mode, to thereby reduce the power consumption to meet the display power system management (DPMS) standard.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

[1. A power-saving circuit for a digital video display device, comprising:

a transmission minimized differential signaling driving unit for converting a transmission minimized differential signaling data signal input together with a transmission minimized differential signaling clock signal to the transmission minimized differential signaling driving unit into horizontal and vertical synchronous signals and a digital video signal based on a transmission minimized differential signaling signal conversion mode;

a display driving unit for driving a display unit based on the horizontal and vertical synchronous signals and the digital video signal input from the transmission minimized differential signaling driving unit;

a clock signal detecting unit for outputting a first level of a clock detecting signal when the transmission minimized differential signaling clock signal is not input to the transmission minimized differential signaling driving unit and for outputting a second level of the clock detecting signal when the transmission minimized differential signaling clock signal is input to the transmission minimized differential signaling driving unit;

a controller for outputting a first level of a power-saving signal when the first level of the clock detecting signal is input to the controller from the clock signal detecting unit, and for outputting a second level of the power-saving signal when the second level of the clock detecting signal is input to the controller from the clock signal detecting unit; and a power supply unit for supplying a voltage to the transmission minimized differential signaling driving unit, the controller, the clock signal detecting unit and the display driving unit, for cutting off the supply of the voltage except to the controller and the clock signal detecting unit when the first level of the power-saving signal is input to the power supply unit from the controller, and for providing the supply of the voltage to the transmission minimized differential signaling driving unit, the controller, the clock signal detecting unit and the display driving unit when the second level of the power-saving signal is input to the power supply unit from the controller.]

[2. The power-saving circuit as claimed in claim 1, further comprised of the clock signal detecting unit comprising:

a first capacitor for removing direct current components of the transmission minimized differential signaling clock signal;

an amplifying transistor connected to the first capacitor for amplifying the transmission minimized differential signaling clock signal without the direct current components removed by the first capacitor to provide an amplified signal;

a first resistor connected to the base of the amplifying transistor for biasing the base of the amplifying transistor;

a second resistor connected to the collector of the amplifying transistor for biasing the collector of the amplifying transistor;

a switching transistor connected to the emitter and the collector of the amplifying transistor, the switching transistor being switched based on the amplified signal received from the amplifying transistor, and for outputting one of a low level signal and a high level signal through the collector of the switching transistor, the low level signal corresponding to the first level of the clock detecting signal and the high level signal corresponding to the second level of the clock detecting signal;

a third resistor connected to the collector of the switching transistor for biasing the collector of the switching transistor; and a second capacitor connected to the emitter of the switching transistor, and a fourth resistor connected to the second capacitor and the collector of the switching transistor, the second capacitor and the fourth resistor for smoothing an output signal of the switching transistor, the output signal of the switching transistor corresponding to one of the first level of the clock detecting signal and the second level of the clock detecting signal.]

[3. The power-saving circuit as claimed in claim 2, further comprised of the first resistor of the clock signal detecting unit including a pair of resistors connected to the base of the amplifying transistor for biasing the base of the amplifying transistor.]

[4. A power-saving circuit for a digital video display device, comprising:

a transmission minimized differential signaling driving unit for converting a transmission minimized differential signaling data signal input together with a transmission minimized differential signaling clock signal to the transmission minimized differential signaling driving unit into horizontal and vertical synchronous signals and a digital video signal based on a transmission minimized differential signaling signal conversion mode, for stopping a driving of an operation for signal converting when a first level of a power-down signal is input to the transmission minimized differential signaling driving unit, and for starting the driving of the operation for signal converting when a second level of the power-down signal is input to the transmission minimized differential signaling driving unit;

a display driving unit for driving a display unit based on the horizontal and vertical synchronous signals and the digital video signal input to the display driving unit from the transmission minimized differential signaling driving unit;

a clock signal detecting unit for outputting a first level of a clock detecting signal when the transmission minimized differential signaling clock signal is not input to the transmission minimized differential signaling driving unit and for outputting a second level of the clock detecting signal when the transmission minimized differential signaling clock signal is input to the transmission minimized differential signaling driving unit;

a controller for outputting the first level of the power-down signal to the transmission minimized differential signaling driving unit and for outputting a first level of a power-saving signal when the first level of clock detecting signal is input to the controller from the clock signal detecting unit, and for outputting the second level of the power-down signal to the transmission minimized differential signaling driving unit and for outputting a second level of the power-saving signal when the second level of the clock detecting signal is input to the controller from the clock signal detecting unit; and a power supply unit for supplying a voltage to the transmission minimized differential signaling driving unit, the display driving unit, the clock signal detecting unit and the controller, for cutting off the supply of the voltage except to the controller, the transmission minimized differential signaling driving unit and the clock signal detecting unit when the first level of the power-saving signal is input to the power supply unit from the controller, and for providing the supply of the voltage to the transmission minimized differential signaling driving unit, the display driving unit, the clock signal detecting unit and the controller when the second level of power-saving signal is input to the power supply unit from the controller.]

[5. The power-saving circuit as claimed in claim 4, further comprised of the clock signal detecting unit comprising:

a first capacitor for removing direct current components of the transmission minimized differential signaling clock signal;

an amplifying transistor connected to the first capacitor for amplifying the transmission minimized differential signaling clock signal without the direct current components removed by the first capacitor to provide an amplified signal;

a first resistor connected to the base of the amplifying transistor for biasing the base of the amplifying transistor;

a second resistor connected to the collector of the amplifying transistor for biasing the collector of the amplifying transistor;

a switching transistor connected to the emitter and the collector of the amplifying transistor, the switching transistor being switched based on the amplified signal received from the amplifying transistor, and for outputting one of a low level signal and a high level signal through the collector of the switching transistor, the low level signal corresponding to the first level of the clock detecting signal and the high level signal corresponding to the second level of the clock detecting signal;

a third resistor connected to the collector of the switching transistor for biasing the collector of the switching transistor; and a second capacitor connected to the emitter of the switching transistor, and a fourth resistor connected to the second capacitor and the collector of the switching transistor, the second capacitor and the fourth resistor for smoothing an output signal of the switching transistor, the output signal of the switching transistor corresponding to one of the first level of the clock detecting signal and the second level of the clock detecting signal.]

[6. The power-saving circuit as claimed in claim 5, further comprised of the first resistor of the clock signal detecting unit including a pair of resistors connected to the base of the amplifying transistor for biasing the base of the amplifying transistor.]

[7. A power-saving circuit for a digital video display device, comprising:

a transmission minimized differential signaling driving unit for converting a transmission minimized differential signaling data signal input together with a transmission minimized differential signaling clock signal to the transmission minimized differential signaling driving unit into horizontal and vertical synchronous signals and a digital video signal based on a transmission minimized differential signaling signal conversion mode;

a display driving unit for driving a display unit based on the horizontal and vertical synchronous signals and the digital video signal input to the display driving unit from the transmission minimized differential signaling driving unit;

a clock signal detecting unit for outputting a first level of a clock detecting signal when the transmission minimized differential signaling clock signal is not input to the transmission minimized differential signaling driving unit, and for outputting a second level of the clock detecting signal when the transmission minimized differential signaling clock signal is input to the transmission minimized differential signaling driving unit; and a power supply unit for supplying a voltage to the transmission minimized differential signaling driving unit, the display driving unit and the clock signal detecting unit, for cutting off the supply of the voltage except to the clock signal detecting unit when the first level of the clock detecting signal is input to the power supply unit from the clock signal detecting unit, and for providing the supply of the voltage to the transmission minimized differential signaling driving unit, the display driving unit and the clock signal detecting unit when the second level of the clock detecting signal is input to the power supply unit from the clock signal detecting unit.]

[8. The power-saving circuit as claimed in claim 7, further comprised of the clock signal detecting unit comprising:

a first capacitor for removing direct current components of the transmission minimized differential signaling clock signal;

an amplifying transistor connected to the first capacitor for amplifying the transmission minimized differential signaling clock signal without the direct current components removed by the first capacitor to provide an amplified signal;

a first resistor connected to the base of the amplifying transistor for biasing the base of the amplifying transistor;

a second resistor connected to the collector of the amplifying transistor for biasing the collector of the amplifying transistor;

a switching transistor connected to the emitter and the collector of the amplifying transistor, the switching transistor being switched based on the amplified signal received from the amplifying transistor, and for outputting one of a low level signal and a high level signal through the collector of the switching transistor, the low level signal corresponding to the first level of the clock detecting signal and the high level signal corresponding to the second level of the clock detecting signal;

a third resistor connected to the collector of the switching transistor for biasing the collector of the switching transistor; and a second capacitor connected to the emitter of the switching transistor, and a fourth resistor connected to the second capacitor and the collector of the switching transistor, the second capacitor and the fourth resistor for smoothing an output signal of the switching transistor, the output signal of the switching transistor corresponding to one of the first level of the clock detecting signal and the second level of the clock detecting signal.]

[9. The power-saving circuit as claimed in claim 8, further comprised of the first resistor of the clock signal detecting unit including a pair of resistors connected to the base of the amplifying transistor for biasing the base of the amplifying transistor.]

[10. A power-saving circuit for a digital video display device, comprising:

a transmission minimized differential signaling driving unit for converting a transmission minimized differential signaling data signal input together with a transmission minimized differential signaling clock signal to the transmission minimized differential signaling driving unit into horizontal and vertical synchronous signals and a digital video signal based on a transmission minimized differential signaling signal conversion mode, for stopping a driving of an operation for signal converting when a first level of a clock detecting signal is input to the transmission minimized differential signaling driving unit, and for starting the driving of the operation for signal converting when a second level of the clock detecting signal is input to the transmission minimized differential signaling driving unit;

a display driving unit for driving a display unit based on the horizontal and vertical synchronous signals and the digital video signal input to the display driving unit from the transmission minimized differential signaling driving unit;

a clock signal detecting unit for outputting the first level of the clock detecting signal to the transmission minimized differential signaling driving unit when the transmission minimized differential signaling clock signal is not input to the transmission minimized differential signaling driving unit, and for outputting the second level of the clock detecting signal to the transmission minimized differential signaling driving unit when the transmission minimized differential signaling clock signal is input to the transmission minimized differential signaling driving unit; and a power supply unit for supplying a voltage to the transmission minimized differential signaling driving unit, the display driving unit, and the clock signal detecting unit, for cutting off the supply of the voltage except to the transmission minimized differential signaling driving unit and the clock signal detecting unit when the first level of the clock detecting signal is input to the power supply unit from the clock signal detecting unit, and for providing the supply of the voltage to the transmission minimized differential signaling driving unit, the display driving unit, and the clock signal detecting unit when the second level of the clock detecting signal is input to the power supply unit from the clock signal detecting unit.]

[11. The power-saving circuit as claimed in claim 10, further comprised of the clock signal detecting unit comprising:

a first capacitor for removing direct current components of the transmission minimized differential signaling clock signal;

an amplifying transistor connected to the first capacitor for amplifying the transmission minimized differential signaling clock signal without the direct current components removed by the first capacitor to provide an amplified signal;

a first resistor connected to the base of the amplifying transistor for biasing the base of the amplifying transistor;

a second resistor connected to the collector of the amplifying transistor for biasing the collector of the amplifying transistor;

a switching transistor connected to the emitter and the collector of the amplifying transistor, the switching transistor being switched based on the amplified signal received from the amplifying transistor, and for outputting one of a low level signal and a high level signal through the collector of the switching transistor, the low level signal corresponding to the first level of the clock detecting signal and the high level signal corresponding to the second level of the clock detecting signal;

a third resistor connected to the collector of the switching transistor for biasing the collector of the switching transistor; and a second capacitor connected to the emitter of the switching transistor, and a fourth resistor connected to the second capacitor and the collector of the switching transistor, the second capacitor and the fourth resistor for smoothing an output signal of the switching transistor, the output signal of the switching transistor corresponding to one of the first level of the clock detecting signal and the second level of the clock detecting signal.]

[12. The power-saving circuit as claimed in claim 11, further comprised of the first resistor of the clock signal detecting unit including a pair of resistors connected to the base of the amplifying transistor for biasing the base of the amplifying transistor.]

[13. A power-saving method for a digital video display device, comprising the steps of:

converting by a transmission minimized differential signaling driving unit a transmission minimized differential signaling data signal input together with a transmission minimized differential signaling clock signal to the transmission minimized differential signaling driving unit into horizontal and vertical synchronous signals and a digital video signal based on a transmission minimized differential signaling signal conversion mode;

driving by a display driving unit a display unit based on the horizontal and vertical synchronous signals and the digital video signal input from the transmission minimized differential signaling driving unit;

outputting by a clock signal detecting unit a first level of a clock detecting signal when the transmission minimized differential signaling clock signal is not input to the transmission minimized differential signaling driving unit and outputting by the clock signal detecting unit a second level of the clock detecting signal when the transmission minimized differential signaling clock signal is input to the transmission minimized differential signaling driving unit;

outputting by a controller a first level of a power-saving signal when the first level of the clock detecting signal is input to the controller from the clock signal detecting unit, and outputting by the controller a second level of the power-saving signal when the second level of the clock detecting signal is input to the controller from the clock signal detecting unit; and supplying by a power supply unit a voltage to the transmission minimized differential signaling driving unit, the controller, the clock signal detecting unit and the display driving unit, cutting off by the power supply unit the supply of the voltage except to the controller and the clock signal detecting unit when the first level of the power-saving signal is input to the power supply unit from the controller, and providing by the power supply unit the supply of the voltage to the transmission minimized differential signaling driving unit, the controller, the clock signal detecting unit and the display driving unit when the second level of the power-saving signal is input to the power supply unit from the controller.]

[14. A power-saving method for a digital video display device, comprising the steps of:

converting by a transmission minimized differential signaling driving unit a transmission minimized differential signaling data signal input together with a transmission minimized differential signaling clock signal to the transmission minimized differential signaling driving unit into horizontal and vertical synchronous signals and a digital video signal based on a transmission minimized differential signaling signal conversion mode, stopping by the transmission minimized differential signaling driving unit a driving of an operation for signal converting when a first level of a power-down signal is input to the transmission minimized differential signaling driving unit, and starting by the transmission minimized differential signaling driving unit the driving of the operation for signal converting when a second level of the power-down signal is input to the transmission minimized differential signaling driving unit;

driving by a display driving unit a display unit based on the horizontal and vertical synchronous signals and the digital video signal input to the display driving unit from the transmission minimized differential signaling driving unit;

outputting by a clock signal detecting unit a first level of a clock detecting signal when the transmission minimized differential signaling clock signal is not input to the transmission minimized differential signaling driving unit and outputting by the clock signal detecting unit a second level of the clock detecting signal when the transmission minimized differential signaling clock signal is input to the transmission minimized differential signaling driving unit;

outputting by a controller the first level of the power-down signal to the transmission minimized differential signaling driving unit and outputting by the controller a first level of a power-saving signal when the first level of clock detecting signal is input to the controller from the clock signal detecting unit, and outputting by the controller the second level of the power-down signal to the transmission minimized differential signaling driving unit and outputting by the controller a second level of the power-saving signal when the second level of the clock detecting signal is input to the controller from the clock signal detecting unit; and supplying by a power supply unit a voltage to the transmission minimized differential signaling driving unit, the display driving unit, the clock signal detecting unit and the controller, cutting off by the power supply unit the supply of the voltage except to the controller, the transmission minimized differential signaling driving unit and the clock signal detecting unit when the first level of the power-saving signal is input to the power supply unit from the controller, and providing by the power supply unit the supply of the voltage to the transmission minimized differential signaling driving unit, the display driving unit, the clock signal detecting unit and the controller when the second level of power-saving signal is input to the power supply unit from the controller.]

[15. A power-saving method for a digital video display device, comprising the steps of:

converting by a transmission minimized differential signaling driving unit a transmission minimized differential signaling data signal input together with a transmission minimized differential signaling clock signal to the transmission minimized differential signaling driving unit into horizontal and vertical synchronous signals and a digital video signal based on a transmission minimized differential signaling signal conversion mode;

driving by a display driving unit a display unit based on the horizontal and vertical synchronous signals and the digital video signal input to the display driving unit from the transmission minimized differential signaling driving unit;

outputting by a clock signal detecting unit a first level of a clock detecting signal when the transmission minimized differential signaling clock signal is not input to the transmission minimized differential signaling driving unit, and outputting by the clock signal detecting unit a second level of the clock detecting signal when the transmission minimized differential signaling clock signal is input to the transmission minimized differential signaling driving unit; and supplying by a power supply unit a voltage to the transmission minimized differential signaling driving unit, the display driving unit and the clock signal detecting unit, cutting off by the power supply unit the supply of the voltage except to the clock signal detecting unit when the first level of the clock detecting signal is input to the power supply unit from the clock signal detecting unit, and providing by the power supply unit the supply of the voltage to the transmission minimized differential signaling driving unit, the display driving unit and the clock signal detecting unit when the second level of the clock detecting signal is input to the power supply unit from the clock signal detecting unit.]

[16. A power-saving method for a digital video display device, comprising the steps of:

converting by a transmission minimized differential signaling driving unit a transmission minimized differential signaling data signal input together with a transmission minimized differential signaling clock signal to the transmission minimized differential signaling driving unit into horizontal and vertical synchronous signals and a digital video signal based on a transmission minimized differential signaling signal conversion mode, stopping by the transmission minimized differential signaling driving unit a driving of an operation for signal converting when a first level of a clock detecting signal is input to the transmission minimized differential signaling driving unit, and starting by the transmission minimized differential signaling driving unit the driving of the operation for signal converting when a second level of the clock detecting signal is input to the transmission minimized differential signaling driving unit;

driving by a display driving unit a display unit based on the horizontal and vertical synchronous signals and the digital video signal input to the display driving unit from the transmission minimized differential signaling driving unit;

outputting by a clock signal detecting unit the first level of the clock detecting signal to the transmission minimized differential signaling driving unit when the transmission minimized differential signaling clock signal is not input to the transmission minimized differential signaling driving unit, and outputting by the clock signal detecting unit the second level of the clock detecting signal to the transmission minimized differential signaling driving unit when the transmission minimized differential signaling clock signal is input to the transmission minimized differential signaling driving unit; and supplying by a power supply unit a voltage to the transmission minimized differential signaling driving unit, the display driving unit, and the clock signal detecting unit, cutting off by the power supply unit the supply of the voltage except to the transmission minimized differential signaling driving unit and the clock signal detecting unit when the first level of the clock detecting signal is input to the power supply unit from the clock signal detecting unit, and providing by the power supply unit the supply of the voltage to the transmission minimized differential signaling driving unit, the display driving unit, and the clock signal detecting unit when the second level of the clock detecting signal is input to the power supply unit from the clock signal detecting unit.]

[17. A power-saving circuit for a digital video display device having a transmission minimized differential signaling driving unit having a signal conversion mode for converting a transmission minimized differential signaling data signal and a transmission minimized differential signaling clock signal input to the transmission minimized differential signaling driving unit into horizontal and vertical synchronous signals and a digital video signal, a display driving unit for driving a display unit based on the horizontal and vertical synchronous signals and the digital video signal input from the transmission minimized differential signaling driving unit and a power supply unit for supplying a voltage to the transmission minimized differential signaling driving unit and the display driving unit, said power-saving circuit comprising:

a clock signal detecting unit outputting a first level of a clock detecting signal when the transmission minimized differential signaling clock signal is not input to the transmission minimized differential signaling driving unit and outputting a second level of the clock detecting signal when the transmission minimized differential signaling clock signal is input to the transmission minimized differential signaling driving unit;

said power supply unit cutting off the supply of the voltage to at least one of the transmission minimized differential signaling driving unit and the display driving unit when the clock signal detecting unit outputs the first level of the clock detecting signal, and providing the supply of the voltage to the transmission minimized differential signaling driving unit and the display driving unit when the clock signal detecting unit outputs the second level of the clock detecting signal.]

[18. The power-saving circuit as claimed in claim 17, further comprised of the clock signal detecting unit comprising:

a first capacitor removing direct current components of the transmission minimized differential signaling clock signal;

an amplifying transistor connected to the first capacitor amplifying the transmission minimized differential signaling clock signal without the direct current components removed by the first capacitor to provide an amplified signal;

a first resistor connected to the base of the amplifying transistor biasing the base of the amplifying transistor;

a second resistor connected to the collector of the amplifying transistor biasing the collector of the amplifying transistor;

a switching transistor connected to the emitter and the collector of the amplifying transistor, the switching transistor being switched based on the amplified signal received from the amplifying transistor, and outputting one of a low level signal and a high level signal through the collector of the switching transistor, the low level signal corresponding to the first level of the clock detecting signal and the high level signal corresponding to the second level of the clock detecting signal;

a third resistor connected to the collector of the switching transistor biasing the collector of the switching transistor; and a second capacitor connected to the emitter of the switching transistor, and a fourth resistor connected to the second capacitor and the collector of the switching transistor, the second capacitor and the fourth resistor smoothing an output signal of the switching transistor, the output signal of the switching transistor corresponding to one of the first level of the clock detecting signal and the second level of the clock detecting signal.]

[19. The power-saving circuit as claimed in claim 18, further comprised of the first resistor of the clock signal detecting unit including a pair of resistors connected to the base of the amplifying transistor biasing the base of the amplifying transistor.]

[20. The power-saving circuit as claimed in claim 17, said power supply unit cutting off the supply of the voltage to both the transmission minimized differential signaling driving unit and the display driving unit when the clock signal detecting unit outputs the first level of the clock detecting signal.]

[21. The power-saving circuit as claimed in claim 17, further comprising:

a controller outputting a first level of a power-saving signal when the first level of the clock detecting signal is input to the controller from the clock signal detecting unit, and outputting a second level of the power-saving signal when the second level of the clock detecting signal is input to the controller from the clock signal detecting unit;

said power supply unit further supplying a voltage to the controller and the clock signal detecting unit, cutting off the supply of the voltage to both the transmission minimized differential signaling driving unit and the display driving unit, but not to the controller and the clock signal detecting unit, when the first level of the power-saving signal is input to the power supply unit from the controller; and said power supply unit re-supplying the voltage to the transmission minimized differential signaling driving unit and the display driving unit when the second level of the power-saving signal is input to the power supply unit from the controller.]

[22. The power-saving circuit as claimed in claim 17, further comprising:

a controller outputting a first level of a power-down signal to the transmission minimized differential signaling driving unit and outputting a first level of a power-saving signal to the power supply unit when the first level of clock detecting signal is input to the controller from the clock signal detecting unit, said transmission minimized differential signaling driving unit stopping the signal conversion mode in response to said first level of a power-down signal;

said controller outputting a second level of the power-down signal to the transmission minimized differential signaling driving unit and outputting a second level of the power-saving signal to the power supply unit when the second level of the clock detecting signal is input to the controller from the clock signal detecting unit, said transmission minimized differential signaling driving unit starting the signal conversion mode in response to said second level of the power-down signal; and said power supply unit further supplying a voltage to the clock signal detecting unit and the controller, cutting off the supply of the voltage to said display driving unit, but not to the controller, the transmission minimized differential signaling driving unit and the clock signal detecting unit, when the first level of the power-saving signal is input to the power supply unit from the controller, and re-supplying of the voltage to the display driving unit when the second level of power-saving signal is input to the power supply unit from the controller.]

[23. The power-saving circuit as claimed in claim 17, further comprising:

a controller outputting a first level of a power-saving signal when the first level of the clock detecting signal is input to the controller from the clock signal detecting unit, and outputting a second level of the power-saving signal when the second level of the clock detecting signal is input to the controller from the clock signal detecting unit;

said power supply unit further supplying a voltage to the controller and the clock signal detecting unit, cutting off the supply of the voltage to said at least one of the transmission minimized differential signaling driving unit and the display driving unit, but not to the controller and the clock signal detecting unit, when the first level of the power-saving signal is input to the power supply unit from the controller; and said power supply unit re-supplying the voltage to the transmission minimized differential signaling driving unit and the display driving unit when the second level of the power-saving signal is input to the power supply unit from the controller.]

[24. The power-saving circuit as claimed in claim 23, further comprising:

said controller outputting a first level of a power-down signal to the transmission minimized differential signaling driving unit when the first level of clock detecting signal is input to the controller from the clock signal detecting unit, said transmission minimized differential signaling driving unit stopping the signal conversion mode in response to said first level of a power-down signal; and said controller outputting a second level of the power-down signal to the transmission minimized differential signaling driving unit when the second level of the clock detecting signal is input to the controller from the clock signal detecting unit, said transmission minimized differential signaling driving unit starting the signal conversion mode in response to said second level of the power-down signal.]

[25. The power-saving circuit as claimed in claim 17, further comprising:

said clock signal detecting unit outputting the first level of the clock detecting signal to the transmission minimized differential signaling driving unit when the transmission minimized differential signaling clock signal is not input to the transmission minimized differential signaling driving unit, said transmission minimized differential signaling driving unit stopping the signal conversion mode in response to said first level of the clock detecting signal; and said clock signal detecting unit outputting the second level of the clock detecting signal to the transmission minimized differential signaling driving unit when the transmission minimized differential signaling clock signal is input to the transmission minimized differential signaling driving unit, said transmission minimized differential signaling driving unit starting the signal conversion mode in response to said second level of the clock detecting signal.]

*26. A display apparatus having a normal power mode and a power savings mode, said apparatus comprising:*

*a receiving unit for receiving a digital signal that comprises a data signal and a clock signal from an external device;*

*a power supply unit for supplying voltage to components of the display apparatus in the normal power mode in which the receiving unit is receiving the clock signal from the external device; and*

*a controller for controlling the power supply unit to convert the normal power mode to the power savings mode in*

*response to the receiving unit being in an abnormal reception state of the clock signal from the external device,*

*wherein in the power savings mode, supply of the power to one or more of the components of the display apparatus is interrupted.*

*27. The display apparatus as claimed in claim 26, further comprising: a clock signal detecting unit for detecting whether the clock signal is received.*

*28. The display apparatus as claimed in claim 26, wherein the power supply unit cuts off supply of the power to the one or more components of the display unit except the controller in the power savings mode.*

*29. The display apparatus as claimed in claim 26, wherein the data signal comprises a transmission minimized differential signaling (TMDS) data signal, and the clock signal comprises a transmission minimized differential signaling (TMDS) clock signal.*

*30. The display apparatus as claimed in claim 26, further comprising:*

*a display unit; and*

*a display driving unit for driving the display unit based on the digital signal,*

*wherein the controller controls the power supply unit to cut off the supply of the power to at least one of the display unit and the display driving unit in the power savings mode.*

*31. The display apparatus as claimed in claim 26, wherein the controller controls the power supply unit to convert the normal power mode to the power savings mode immediately when the abnormal reception state of the clock signal happens.*

*32. The display apparatus as claimed in claim 26, wherein the abnormal reception state of the clock signal comprises a state in which the clock signal is not received by the receiving unit from the external device.*

*33. The display apparatus as claimed in claim 26, wherein the abnormal reception state of the clock signal comprises a state in which the external device is not connected to the receiving unit.*

*34. The display apparatus as claimed in claim 26,*

*wherein the receiving unit comprises a port configured to be connected with a connector of the external device to receive the digital signal, and*

*wherein the abnormal reception state of the clock signal comprises a state in which the connector of the external device is disconnected from the port of the receiving unit.*

*35. The display apparatus as claimed in claim 26, wherein the abnormal reception state of the clock signal happens while the digital signal received by the receiving unit is converted to synchronous signals and a digital video signal to be output to a display driving unit.*

*36. A power saving method of a display apparatus having a normal power mode and a power savings mode, the method comprising:*

*receiving a digital signal comprising a data signal and a clock signal in the normal power mode from an external device;*

*supplying power to components of the display apparatus in the normal power mode in which the clock signal is being received from the external device;*

*converting the normal power mode to the power savings mode in response to the display apparatus being in an abnormal reception state of the clock signal,*

*wherein in the power savings mode, supply of the power to one or more of the components of the display apparatus is interrupted.*

*37. The power saving method as claimed in claim 36, wherein the converting step comprises partly cutting off the supply of the voltage to the one or more of the components of the display apparatus in the power savings mode.*

*38. The power saving method as claimed in claim 36, wherein the data signal comprises a transmission minimized differential signaling (TMDS) data signal, and the clock signal comprises a transmission minimized differential signaling (TMDS) clock signal.*

*39. The power saving method as claimed in claim 36, wherein the converting the normal power mode to the power savings mode immediately when the abnormal reception state of the clock signal happens.*

*40. The power saving method as claimed in claim 36, wherein the abnormal reception state of the clock signal comprises a state in which the clock signal is not received from the external device.*

*41. The power saving method as claimed in claim 36, wherein the abnormal reception state of the clock signal comprises a state in which the external device is not connected to the display apparatus.*

*42. The power saving method as claimed in claim 36, wherein the abnormal reception state of the clock signal happens while the received digital signal is converted to synchronous signals and a digital video signal to be output to drive a display unit of the display apparatus.*

*43. A display apparatus having a normal power mode and a power savings mode, said apparatus comprising:*

*a receiving unit for receiving a digital signal that comprises a data signal and a clock signal from an external device;*

*a power supply unit for supplying power to components of the display apparatus; and*

*a controller for controlling the power supply unit to supply the power to the components of the display apparatus in the normal power mode in which the clock signal is being received by the receiving unit from the external device, and to convert the normal power mode to the power savings mode in response to the clock signal not being received by the receiving unit;*

*wherein in the power savings mode, supply of the power to one or more of the components of the display apparatus is interrupted.*

*44. The display apparatus as claimed in claim 43, further comprising:*

*a clock signal detecting unit for detecting whether the clock signal is received.*

*45. The display apparatus as claimed in claim 43, wherein the power supply unit cuts off the supply of the power to the one or more of the components of the display apparatus except the controller in the power savings mode.*

*46. The display apparatus as claimed in claim 43, wherein the data signal comprises a transmission minimized differential signaling (TMDS) data signal, and the clock signal comprises a transmission minimized differential signaling (TMDS) clock signal.*

*47. The display apparatus as claimed in claim 43, further comprising:*

*a display unit; and*

*a display driving unit for driving the display unit based on the digital signal,*

*wherein the controller controls the power supply unit to cut off the supply of the power to at least one of the display unit and the display driving unit in the power savings mode.*

*48. A display apparatus comprising:*

*a display unit;*

*a driver configured to convert a transmission minimized differential signaling (TMDS) data signal and a TMDS clock signal input to the driver into a video signal and a synchronous signal to display an image on the display unit; and*

*a power supply configured to supply power to the display unit if the driver is receiving the TMDS clock signal from an external device and reduce the power supplied to the display unit in response to the driver being in an abnormal reception state of the TMDS clock signal.*

*49. The display apparatus as claimed in claim 48, wherein the power supply cuts off the power supplied to the display unit in response to the driver being in the abnormal reception state of the TMDS clock signal.*

*50. The display apparatus as claimed in claim 48, further comprising a controller configured to control the power supply to supply the power to the display unit.*

*51. The display apparatus as claimed in claim 50,*

*wherein the controller outputs a power-down signal to the driver in response to the driver being in the abnormal reception state of the TMDS clock signal, and*

*wherein, in response to receiving the power-down signal, the driver stops an operation for converting the TMDS data signal and the TMDS clock signal.*

*52. The display apparatus as claimed in claim 51,*

*wherein the controller outputs a restoring signal to the driver after the driver being out of the abnormal reception state of the TMDS clock signal, and*

*wherein, in response to receiving the restoring signal, the driver restores the operation for converting the TMDS data signal and the TMDS clock signal.*

*53. The display apparatus as claimed in claim 50,*

*wherein the controller outputs a restoring signal to the power supply after the driver being out of the abnormal reception state of the TMDS clock signal, and*

*wherein, in response to receiving the restoring signal, the power supply restores the power supplied to the display unit.*

*54. The display apparatus as claimed in claim 48, wherein in response to the driver being in the abnormal reception state of the TMDS clock signal, the driver stops an operation for converting the TMDS data signal and the TMDS clock signal.*

*55. The display apparatus as claimed in claim 54, wherein after the driver being out of the abnormal reception state of the TMDS clock signal, the driver restores the operation for converting the TMDS data signal and the TMDS clock signal.*

*56. The display apparatus as claimed in claim 48, wherein after the driver being out of the abnormal reception state of the TMDS clock signal, the power supply restores the power supplied to the display unit.*

*57. The display apparatus as claimed in claim 48, wherein the driver comprises:*

*a capacitor configured to remove a direct current component of the TMDS clock signal; and*

*at least one transistor configured to be switched based on the TMDS clock signal, from which the direct current component has been removed, to output an output signal to control the power supply.*

*58. The display apparatus as claimed in claim 48, further comprising a display driver configured to drive the display based on the video signal and the synchronous signal output by the driver.*

*59. The display apparatus as claimed in claim 48, wherein the power supply is configured to reduce the power supplied to the display unit immediately when the driver is in the abnormal reception state of the TMDS clock signal happens.*

*60. The display apparatus as claimed in claim 48, wherein the abnormal reception state of the TMDS clock signal comprises a state in which the TMDS clock signal is not received by the driver from the external device.*

*61. The display apparatus as claimed in claim 48, wherein the abnormal reception state of the TMDS clock signal comprises a state in which the external device is not connected to the driver.*

*62. The display apparatus as claimed in claim 48, further comprising:*

*a display driver configured to drive the display unit of the display apparatus based on the video signal and the synchronous signal output by the driver.*

*63. A display apparatus comprising:*

*a display unit;*

*a transmission minimized differential signaling (TMDS) driving unit configured to receive a TMDS data signal and a TMDS clock signal for displaying the image on the display unit; and*

*a controller configured to control power supplied to the display unit if the TMDS driving unit is receiving the TMDS clock signal from an external device and reduce the power supplied to the display unit in response to the TMDS driving unit being in an abnormal reception state of the TMDS clock signal.*

*64. The display apparatus as claimed in claim 63, wherein the TMDS driving unit is configured to convert the TMDS data signal and the TMDS clock signal input to the TMDS driving unit into a video signal and a synchronous signal.*

*65. The display apparatus as claimed in claim 63, wherein the TMDS driving unit comprises a clock signal input configured to input the TMDS clock signal.*

*66. The display apparatus as claimed in claim 63, wherein the abnormal reception state of the TMDS clock signal comprises a state in which the TMDS clock signal is not received by the TMDS driving unit.*

*67. The display apparatus as claimed in claim 63, wherein the controller is configured to reduce the power supplied to the display unit immediately when the TMDS driving unit is in an abnormal reception state of the TMDS clock signal.*

*68. A display apparatus comprising:*

*a display unit;*

*a transmission minimized differential signaling (TMDS) driving unit configured to receive a TMDS data signal and a TMDS clock signal for displaying the image on the display unit; and*

*a controller configured to control power supplied to the display unit if the TMDS driving unit is receiving the TMDS clock signal from an external device and, in response to the TMDS clock signal not being input to the TMDS driving unit, control the display apparatus to be set as a power-saving mode and output a power down signal to reduce the power supplied to the display unit.*

*69. The display apparatus as claimed in claim 68, wherein the TMDS driving unit is configured to convert a TMDS data signal and a TMDS clock signal input to the TMDS driving unit into a video signal and a synchronous signal.*

*70. The display apparatus as claimed in claim 69, wherein the TMDS driving unit comprises a clock signal input configured to input the TMDS clock signal.*

*71. The display apparatus as claimed in claim 70, wherein the abnormal reception state of the TMDS clock signal comprises a state in which the TMDS clock signal is not received by the TMDS driving unit.*

*72. The display apparatus as claimed in claim 68, wherein the controller is configured to control the display apparatus to be set as a power-saving mode and output a power down*

*signal to reduce the power supplied to the display unit, immediately when the TMDS clock signal is not input to the TMDS driving unit.*

*73. A display apparatus comprising:*

*a display unit;*

*a driver configured to receive a transmission minimized differential signaling (TMDS) data signal and a TMDS clock signal and output a video signal and a synchronous signal to display an image on the display unit based on the received TMDS data signal and the received TMDS clock signal; and*

*a power supply configured to supply power to the display unit if the driver is in a first state in which the driver is outputting the video signal and the synchronous signal based on the received TMDS data signal and the received TMDS clock signal, and reduce the power supplied to the display unit if the driver is in a second state in which the driver is not outputting the video signal and the synchronous signal in response to an interrupted state of the TMDS data signal and the TMDS clock signal.*

*74. The display apparatus as claimed in claim 73, wherein the power supply reduces the power supplied to the display unit immediately when the driver is in the second state.*

*75. The display apparatus as claimed in claim 73, wherein the interrupted state of the TMDS data signal and the TMDS clock signal comprises a state in which the TMDS clock signal is not received by the driver from an external device.*

*76. The display apparatus as claimed in claim 73, wherein the interrupted state of the TMDS data signal and the TMDS clock signal comprises a state in which the external device is not connected to the driver.*

*77. The display apparatus as claimed in claim 73,*

*wherein the driver comprises a port configured to be connected with a connector of the external device to receive the TMDS data signal and the TMDS clock signal, and*

*wherein the interrupted state of the TMDS data signal and the TMDS clock signal comprises a state in which the connector of the external device is disconnected from the port of the driver.*

*78. The display apparatus as claimed in claim 73, wherein the interrupted state of the TMDS data signal and the TMDS clock signal happens while driver is being in the first state.*

*79. A display apparatus comprising:*

*a display unit;*

*a transmission minimized differential signaling (TMDS) driving unit configured to receive a TMDS signal for displaying an image on the display unit;*

*a power supply configured to supply power to the display unit; and*

*a controller configured to reduce the power supplied to the display unit in response to the TMDS signal not being input to the TMDS driving unit,*

*wherein the TMDS signal comprises a TMDS data signal and a TMDS clock signal.*

*80. The display apparatus as claimed in claim 79, wherein the power supply cuts off the power supplied to the display unit in response to the TMDS signal not being input to the TMDS driving unit.*

*81. The display apparatus as claimed in claim 79, wherein the TMDS driving unit is configured to convert the TMDS signal into a video signal and a synchronous signal.*

*82. A display apparatus comprising:*

*a display;*

*a transmission minimized differential signaling (TMDS) driving unit configured to receive a TMDS data signal and a TMDS clock signal for displaying an image on the display; and*

*a controller configured to change a first state of the display into a second state of the display based on whether the TMDS clock signal is input to the TMDS driving unit or not.*

*83. The display apparatus as claimed in claim 82,*

*wherein the first state and the second state of the display comprise power supply states of the display, and*

*wherein a level of power which is supplied to the display in the second state is less than a level of power which is supplied to the display in the first state.*

*84. The display apparatus as claimed in claim 82, wherein the controller is configured to change the first state of the display into the second state of the display immediately when the TMDS clock signal is not input to the TMDS driving unit.*

*85. A method of controlling a display apparatus, the method comprising:*

*determining whether a transmission minimized differential signaling (TMDS) clock signal is input to a TMDS driving unit of the display apparatus, the TMDS clock signal being input together with a TMDS data signal for displaying an image on the display apparatus; and*

*changing a first state of the display apparatus into a second state of the display apparatus according that the TMDS clock signal is input to the display apparatus.*

*86. The method as claimed in claim 85,*

*wherein, the first state and the second state of the display apparatus comprise power supply states of the display apparatus, and*

*wherein, a level of power which is supplied to the display apparatus in the second state is less than a level of power which is supplied to the display apparatus in the first state.*

*87. The method as claimed in claim 85, wherein the changing comprises changing the first state of the display apparatus into the second state of the display apparatus immediately when the TMDS clock signal is not input to the TMDS driving unit of the display apparatus.*

* * * * *